US012571083B2

(12) United States Patent (10) Patent No.: US 12,571,083 B2
Saito et al. (45) Date of Patent: Mar. 10, 2026

(54) PLATED STEEL MATERIAL AND METHOD FOR MANUFACTURING PLATED STEEL MATERIAL

(71) Applicant: NIPPON STEEL CORPORATION, Tokyo (JP)

(72) Inventors: Mamoru Saito, Tokyo (JP); Yasuto Goto, Tokyo (JP); Hidetoshi Shindo, Tokyo (JP); Naoyuki Yamato, Tokyo (JP); Yuto Fukuda, Tokyo (JP); Takuya Miyata, Tokyo (JP); Yasuhiro Majima, Tokyo (JP); Kohei Tokuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 68 days.

(21) Appl. No.: 18/844,986

(22) PCT Filed: Dec. 16, 2022

(86) PCT No.: PCT/JP2022/046530
§ 371 (c)(1),
(2) Date: Sep. 9, 2024

(87) PCT Pub. No.: WO2023/176075
PCT Pub. Date: Sep. 21, 2023

(65) Prior Publication Data
US 2025/0188586 A1    Jun. 12, 2025

(30) Foreign Application Priority Data
Mar. 18, 2022    (JP) ................................. 2022-044295

(51) Int. Cl.
| | |
|---|---|
| *C23C 2/06* | (2006.01) |
| *B32B 15/01* | (2006.01) |
| *C22C 18/04* | (2006.01) |
| *C23C 2/02* | (2006.01) |
| *C23C 2/28* | (2006.01) |
| *C23C 2/40* | (2006.01) |

(52) U.S. Cl.
CPC .............. *C23C 2/06* (2013.01); *B32B 15/013* (2013.01); *C22C 18/04* (2013.01); *C23C 2/0224* (2022.08); *C23C 2/024* (2022.08); *C23C 2/026* (2022.08); *C23C 2/29* (2022.08); *C23C 2/40* (2013.01)

(58) Field of Classification Search
CPC .. C22C 18/04; C23C 2/06; C23C 2/29; C23C 2/40
See application file for complete search history.

(56) References Cited

U.S. PATENT DOCUMENTS

| | | | |
|---|---|---|---|
| 11,787,156 B2 * | 10/2023 | Saito | ..................... C23C 28/025 428/659 |
| 2018/0002797 A1 | 1/2018 | Oh et al. | |
| 2019/0390303 A1 | 12/2019 | Tokuda et al. | |
| 2020/0157672 A1 | 5/2020 | Oh et al. | |
| 2022/0371302 A1 | 11/2022 | Saito et al. | |

FOREIGN PATENT DOCUMENTS

| | | | |
|---|---|---|---|
| JP | 2001-355053 A | 12/2001 | |
| JP | 2013-014794 A | 1/2013 | |
| JP | 2018-506644 A | 3/2018 | |
| WO | 2018/139619 A1 | 8/2018 | |
| WO | 2019/221193 A1 | 11/2019 | |
| WO | 2021/095442 A1 | 5/2021 | |

* cited by examiner

*Primary Examiner* — Adam Krupicka
(74) *Attorney, Agent, or Firm* — SOLARIS Intellectual Property Group, PLLC

(57) ABSTRACT

Provided are a coated steel product in which a coating layer has a predetermined chemical composition, and in a back-scattered electron image of a Zn—Al—Mg alloy layer, obtained by polishing a surface of the coating layer to ½ of a layer thickness, and observing the surface at a magnification of 100× with a scanning electron microscope, Zn/Al/MgZn$_2$ ternary eutectics are present, and an average value of a cumulative circumferential length of the Zn/Al/MgZn$_2$ ternary eutectics is from 100 to 300 mm/mm$^2$ and a method of manufacturing the coated steel product.

4 Claims, 2 Drawing Sheets

(A)

(B)

PLATED STEEL MATERIAL AND METHOD FOR MANUFACTURING PLATED STEEL MATERIAL

TECHNICAL FIELD

The present disclosure relates to a coated steel product and a method of manufacturing a coated steel product.

BACKGROUND ART

A wide variety of coated steel products are used, for example, in the field of construction materials. Many of them are Zn-coated steel products. Due to the need for having a long life for construction materials, research on improving the corrosion resistance of Zn-coated steel products has been conducted over a long time, and various coated steel products have been developed. The first high corrosion resistant coated steel product for construction materials was a Zn-5% Al coated steel product (Galfan coated steel product), in which Al was added to a Zn-based coating layer to improve the corrosion resistance. It is a well-known fact that the corrosion resistance is improved by addition of Al into a coating layer, and by addition of 5% of Al, an Al crystal is formed in the coating layer (specifically Zn phase) and the corrosion resistance is improved. A Zn-55% Al-1.6% Si coated steel product (Galvalume steel product) is also a coated steel product, in which corrosion resistance is basically improved for the same reason.

The attractive feature of a Zn-based coated steel product is the sacrificial corrosion protection effect on a base steel. In other words, in a cut edge of a coated steel product, a cracked portion of a coating layer generated at the time of processing, and an exposed portion of a base steel which appears, for example, by exfoliation of a coating layer, the coating layer in the vicinity of such portions dissolves out before corrosion of the base steel, and the dissolved coating component forms a protective film. This makes it possible to prevent rusting in the base steel to some extent.

In general, a lower Al concentration and a higher Zn concentration are preferable because such effects are more likely to be exhibited. Accordingly, a high corrosion-resistant coated steel product in which the Al concentration is reduced to a relatively low concentration of about from 5% to 25% has been available for practical use in recent years. In particular, a coated steel product, in which the Al concentration is suppressed at a low level and Mg is contained at about from 1% to 3%, has superior corrosion resistance with respect to the Galfan coated steel product. Therefore, this has become a market trend in coated steel products, and widely known in the market at present.

As such a coated steel product containing a certain amount of Al and Mg, for example, a coated steel product disclosed in Patent Literature 1 has been also developed.

Specifically, Patent Literature 1 discloses "a hot dip Zn—Al—Mg—Si coated steel product in which 200 or more Al phases exist per 1 mm² on the surface of a coated steel product having a coating layer composed of from 5% to 18% by mass of Al, from 1% to 10% by mass of Mg, from 0.01% to 2% by mass of Si, and the balance of Zn and unavoidable impurities".

In addition, Patent Literature 2 discloses "a coated steel product including a steel product, and a coating layer including a Zn—Al—Mg alloy layer provided on a surface of the steel product, in which the coating layer has a chemical composition composed of Zn at more than 65.0%, Al at more than 5.0% and less than 25.0%, Mg at more than 3.0% and less than 12.5%, and Sn at from 0.1% to 20.0%, and in a backscattered electron image of the Zn—Al—Mg alloy layer, obtained by polishing a surface of the Zn—Al—Mg alloy layer to ½ of a layer thickness, and observing the surface at a magnification of 100× with a scanning electron microscope, Al crystals are present, and an average value of a cumulative circumferential length of the Al crystals is from 88 to 195 mm/mm²".

CITATION LIST

Patent Literature

Patent Literature 1: Japanese Patent Application Laid-Open (JP-A) No. 2001-355053
Patent Literature 2: WO 2019/221193

SUMMARY OF INVENTION

Technical Problem

However, in a coated steel product having a high Mg concentration in a coating layer, when the coated steel product is processed, the coating layer is exfoliated, and the processability becomes poor. In addition, for example, in an environment where water is likely to be accumulated, such as when a coated steel sheet is installed in a direction parallel to the ground and used, corrosion resistance becomes poor.

Therefore, an object of the disclosure is to provide a coated steel product having excellent processability and having excellent corrosion resistance even when used in an environment where water is likely to be accumulated, and a method of manufacturing the coated steel product.

Solution to Problem

The above object is achieved by the following means.
<1>
A coated steel product including a base steel and a coating layer including a Zn—Al—Mg alloy layer provided on a surface of the base steel, in which the coating layer has a chemical composition composed of, in terms of % by mass:
Zn at more than 65.00%,
Al at more than 5.00% and less than 25.00%,
Mg at more than 3.00% and less than 12.50%,
Sn at from 0% to 3.00%,
Bi at from 0% to less than 5.00%,
In at from 0% to less than 2.00%,
Ca at from 0% to 3.00%,
Y at from 0% to 0.50%,
La at from 0% to less than 0.50%,
Ce at from 0% to less than 0.50%,
Si at from 0% to less than 2.50%,
Cr at from 0% to less than 0.25%,
Ti at from 0% to less than 0.25%,
Zr at from 0% to less than 0.25%,
Mo at from 0% to less than 0.25%,
W at from 0% to less than 0.25%,
Ag at from 0% to less than 0.25%,
P at from 0% to less than 0.25%,
Ni at from 0% to less than 0.25%,
Co at from 0% to less than 0.25%
V at from 0% to less than 0.25%,
Nb at from 0% to less than 0.25%,
Cu at from 0% to less than 0.25%,
Mn at from 0% to less than 0.25%,
Li at from 0% to less than 0.25%, Na at from 0% to less than 0.25%, K at from 0% to less than 0.25%, Fe at from 0% to 5.00%, Sr at from 0% to less than 0.5%

Sb at from 0% to less than 0.5%

Pb at from 0% to less than 0.5%,

B at from 0% to less than 0.5%, and impurities, in which, in a backscattered electron image of the Zn—Al—Mg alloy layer, obtained by polishing a surface of the coating layer to ½ of a layer thickness, and observing the surface at a magnification of 100× with a scanning electron microscope, $Zn/Al/MgZn_2$ ternary eutectics are present, and an average value of a cumulative circumferential length of the $Zn/Al/MgZn_2$ ternary eutectics is from 100 to 300 mm/mm$^2$.

<2>

The coated steel product according to <1>, in which the coating layer has an Al—Fe alloy layer between the base steel and the Zn—Al—Mg alloy layer.

<3>

The coated steel product according to <1> or <2>, in which an interface roughness Ra between the base steel and the coating layer is from 0.3 to 2.0 μm.

<4>

A method of manufacturing the coated steel product according to any one of <1> to <3>, in which a base steel having a surface roughness Ra of a surface to be coated of from 0.3 to 2.0 μm is immersed in a coating bath and pulled up from the coating bath, and then cooled down in a temperature range of from 450° C. to 395° C. at an average cooling rate of from 5 to 20° C./s, cooled down in a temperature range of from 395° C. to 340° C. at an average cooling rate of 3° C./s or less, and cooled down in a temperature range of from 340° C. to 280° C. at an average cooling rate of from 10 to 20° C./s.

Advantageous Effects of Invention

According to the disclosure, it is possible to provide a coated steel product having excellent processability and having excellent corrosion resistance even when used in an environment where water is likely to be accumulated, and a method of manufacturing the coated steel product.

DESCRIPTION OF EMBODIMENTS

Figure 1A:
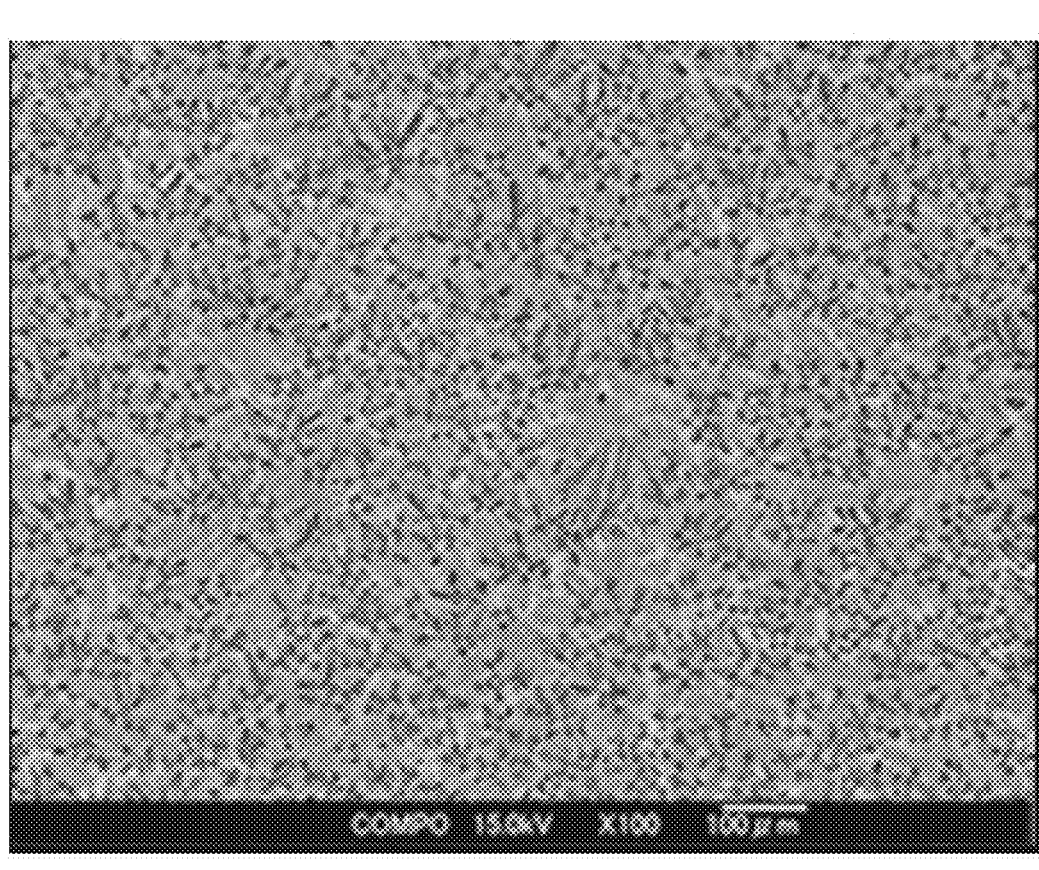
FIG. 1(A) shows a backscattered electron image of a Zn—Al—Mg alloy layer, obtained by polishing a surface of a coating layer in a Zn—Al—Mg-based coated steel product according to the disclosure to ½ of a layer thickness, and observing the surface at a magnification of 100× with a scanning electron microscope.

An example of the disclosure will be described below.

The expression of "%" with respect to the content of each element of a chemical composition means herein "% by mass".

A numerical range expressed using "to" means a range including the numerical values stated before and after "to" as the upper limit and lower limit.

In a case where the numerical values stated before and after "to" are denoted with the term "more than" or "less than", the numerical range means a range not including the numerical value as the upper limit or lower limit.

The content of an element of a chemical composition may be expressed as an element concentration (for example, Zn concentration and Mg concentration).

A coated steel product according to the disclosure includes a base steel and a coating layer including a Zn—Al—Mg alloy layer provided on a surface of the base steel.

In the coated steel product according to the disclosure, a coating layer has a predetermined chemical composition, and in a backscattered electron image of a Zn—Al—Mg alloy layer, obtained by polishing a surface of the coating layer to ½ of a layer thickness, and observing the surface at a magnification of 100× with a scanning electron microscope, $Zn/Al/MgZn_2$ ternary eutectics are present, and an average value of a cumulative circumferential length of the $Zn/Al/MgZn_2$ ternary eutectics is from 100 to 300 mm/mm$^2$.

Owing to the aforedescribed configuration, a coated steel product according to the disclosure can be a coated steel product having excellent processability and having excellent corrosion resistance even when used in an environment where water is likely to be accumulated. The coated steel product according to the disclosure was discovered based on the following knowledge.

In a coated steel product having a high Mg concentration in the coating layer, a hard intermetallic compound phase is formed in the coating layer. Therefore, when the coated steel product is processed, the intermetallic compound phase becomes cracked, and the coating layer is likely to be exfoliated.

In addition, in the case of use in an environment where water is likely to be accumulated, $Zn/Al/MgZn_2$ ternary eutectics in the coating layer corrode locally and the corrosion rapidly reaches the base iron.

Therefore, a $Zn/Al/MgZn_2$ ternary eutectic, which causes local corrosion, is uniformly dispersed in the coating layer. That is, the average value of the cumulative circumferential length of the $Zn/Al/MgZn_2$ ternary eutectics is set within a predetermined range.

Thereby, local corrosion of the $Zn/Al/MgZn_2$ ternary eutectics can be reduced. In addition, since the soft $Zn/Al/MgZn_2$ ternary eutectics function as a cushioning material during processing, cracking of the surrounding intermetallic compound phase can be reduced.

It was discovered based on the following knowledge that, owing to the aforedescribed configuration, the coated steel product according to the disclosure can be a coated steel product having excellent processability and having excellent corrosion resistance even when used in an environment where water is likely to be accumulated.

The coated steel product of the disclosure will be described in detail below.

(Base Steel)

There is no particular restriction on the shape of the base steel. Examples of the base steel include besides a steel sheet, shape processed base steel, such as a steel pipe, a civil engineering and building material (such as fence conduit, corrugated pipe, drain ditch cover, wind-blown sand preventing plate, bolt, wire mesh, guardrail, and cut-off wall), a home electrical appliance component (such as housing for an air conditioner outdoor unit), and an automobile part (such as a suspension system component). For shape processing, for example, various plastic working methods, such as press working, roll forming, and bending, can be used.

There is no particular restriction on the material of the base steel. As the base steel, there are various applicable base steels, and examples thereof include general steel, precoated steel, Al killed steel, ultra-low carbon steel, high carbon steel, various high tensile strength steels, and some high alloy steels (for example, steel containing a strengthening element such as Ni and Cr).

With respect to the base steel, there is also no particular restriction on the method of manufacturing a base steel, or the conditions of a method of manufacturing a base steel sheet (such as a hot rolling method, a pickling method, and a cold rolling method).

In addition, as the base steel, a hot-rolled steel sheet, a hot-rolled steel strip, a cold rolled steel sheet, and a cold rolled steel strip described in JIS G 3302 (2010) are also applicable.

The interface roughness Ra between the base steel and the coating layer is preferably from 0.3 to 2.0 µm.

By setting the surface roughness Ra of the base steel to 0.3 µm or more, the average value of the cumulative circumferential length of the $Zn/Al/MgZn_2$ ternary eutectics can be controlled to be within the above range.

When the surface roughness Ra of the base steel is set at 2.0 µm or less, non-coating is suppressed.

The method of measuring the interface roughness Ra between the base steel and the coating layer is as described later.

The base steel may be a precoated steel product which has been precoated. A precoated steel product is obtained, for example, by an electrolytic treatment method or a displacement coating method. In the electrolytic treatment method, a base steel is immersed in a sulfate bath or chloride bath containing various metal ions corresponding to precoating components, and an electrolytic treatment is performed to obtain a precoated steel product. In the displacement coating method, a base steel is immersed in an aqueous solution, which contains various metal ions corresponding to precoating components, and of which a pH has been adjusted with sulfuric acid, for causing displacement deposition of a metal to obtain a precoated steel product.

Typical examples of a precoated steel product include a Ni precoated steel product.

(Coating Layer)

The coating layer includes a Zn—Al—Mg alloy layer. The coating layer may include an Al—Fe alloy layer in addition to the Zn—Al—Mg alloy layer. The Al—Fe alloy layer is provided between the base steel and the Zn—Al—Mg alloy layer.

That is, the coating layer may have a monolayer structure of a Zn—Al—Mg alloy layer, or a layered structure including a Zn—Al—Mg alloy layer and an Al—Fe alloy layer. In the case of a layered structure, the Zn—Al—Mg alloy layer is preferably a layer constituting the surface of the coating layer.

Although there are some cases where an oxide film of a constituent element of the coating layer is formed on the surface of the coating layer in a thickness of about 50 nm, a thickness thereof is thin relative to the thickness of the entire coating layer (about from 8 to 60 µm) that the oxide film is deemed not to constitute a main part of the coating layer.

A deposited amount of the coating layer is preferably from 40 to 300 g/m² per one surface.

When the deposited amount of the coating layer is 40 g/m² or more, corrosion resistance can be ensured more reliably. Also, when the deposited amount of the coating layer is 300 g/m² or less, appearance defects such as sagging patterns of the coating layer can be suppressed.

Next, the chemical composition of the coating layer will be described.

The chemical composition of the coating layer is a chemical composition composed of, in terms of % by mass:

Zn at more than 65.00%,
Al at more than 5.00% and less than 25.00%,
Mg at more than 3.00% and less than 12.50%,
Sn at from 0% to 3.00%,
Bi at from 0% to less than 5.00%,
In at from 0% to less than 2.00%,
Ca at from 0% to 3.00%,
Y at from 0% to 0.50%,
La at from 0% to less than 0.50%,
Ce at from 0% to less than 0.50%,
Si at from 0% to less than 2.50%,
Cr at from 0% to less than 0.25%,
Ti at from 0% to less than 0.25%,
Zr at from 0% to less than 0.25%,
Mo at from 0% to less than 0.25%,
W at from 0% to less than 0.25%,
Ag at from 0% to less than 0.25%,
P at from 0% to less than 0.25%,
Ni at from 0% to less than 0.25%,
Co at from 0% to less than 0.25%
V at from 0% to less than 0.25%,
Nb at from 0% to less than 0.25%,
Cu at from 0% to less than 0.25%,
Mn at from 0% to less than 0.25%,
Li at from 0% to less than 0.25%,
Na at from 0% to less than 0.25%,
K at from 0% to less than 0.25%,
Fe at from 0% to 5.00%,
Sr at from 0% to less than 0.50%
Sb at from 0% to less than 0.50%
Pb at from 0% to less than 0.50%,
B at from 0% to less than 0.50%, and
impurities.

In the chemical composition of the coating layer, Sn, Bi, In, Ca, Y, La, Ce, Si, Cr, Ti, Zr, Mo, W, Ag, P, Ni, Co, V, Nb, Cu, Mn, Li, Na, K, Fe, Sr, Sb, Pb, and B are optional components. In other words, these elements need not be contained in the coating layer. When any of these optional components is contained, the content of each optional element is preferably in the range described below.

In this regard, the chemical composition of a coating layer is the average chemical composition of the entire coating layer (in the case where the coating layer has a monolayer structure of a Zn—Al—Mg alloy layer, the average chemical composition of the Zn—Al—Mg alloy layer, and in the case where the coating layer has a layered structure of an Al—Fe alloy layer and a Zn—Al—Mg alloy layer, the total average chemical composition of the Al—Fe alloy layer and the Zn—Al—Mg alloy layer).

Each element of a coating layer will be described below.

Zn at More Than 65.00%

Zn is an element necessary for obtaining corrosion resistance. As for Zn concentration in terms of the atomic composition ratio, since the coating layer is composed together with elements having a low specific gravity such as Al and Mg, Zn is required to occupy the main portion also in the atomic composition ratio.

Therefore, the Zn concentration is set above 65.00%. The Zn concentration is preferably 70.00% or more. In this regard, the upper limit of the Zn concentration is a remnant concentration excluding elements other than Zn, and impurities.

Al at More Than 5.00% and Less Than 25.00%

Al is an essential element for forming Al crystals and ensuring corrosion resistance. Also, Al is an essential element for enhancing the adhesion of a coating layer and ensuring the processability. Therefore, the lower limit of the Al concentration is set above 5.00% (preferably at 10.00% or more).

Meanwhile, when the Al concentration increases too much, the corrosion resistance tends to deteriorate. Therefore, the upper limit of the Al concentration is set below 25.00% (preferably at 23.00% or less).

Mg at More Than 3.00% and Less Than 12.50%

Mg is an essential element for ensuring corrosion resistance. Therefore, the lower limit of the Mg concentration is set above 3.0% (preferably above 4.00%).

Meanwhile, when the Mg concentration increases too much, the processability tends to deteriorate. Therefore, the upper limit of the Mg concentration is set at lower than 12.50% (preferably at 10.00% or less).

Sn at from 0% to 3.00%

Sn is an element that contributes to corrosion resistance and initial discoloration resistance. Therefore, the lower limit of the Sn concentration is preferably more than 0.00% (preferably 0.05% or more, and more preferably 0.10% or more).

Meanwhile, when the Sn concentration increases too much, corrosion resistance and initial discoloration resistance tend to deteriorate. Therefore, the upper limit of the Sn concentration is set at 3.00% or less.

Bi at from 0% to Less Than 5.00%

Bi is an element that contributes to corrosion resistance. Therefore, the lower limit of the Bi concentration is preferably more than 0.00% (preferably 0.10% or more, and more preferably 3.00% or more).

Meanwhile, when the Bi concentration increases too much, the corrosion resistance tends to deteriorate. Therefore, the upper limit of the Bi concentration is set below 5.00% (preferably at 4.80% or less).

In at from 0% to Less Than 2.00%

In is an element that contributes to corrosion resistance. Therefore, the lower limit of the In concentration is preferably more than 0.00% (preferably 0.10% or more, and more preferably 1.00% or more).

Meanwhile, when the In concentration increases too much, the corrosion resistance tends to deteriorate. Therefore, the upper limit of the In concentration is set below 2.00% (preferably at 1.80% or less).

Ca at from 0% to 3.00%

Ca is an element capable of adjusting the dissolution amount of Mg at a level optimal for imparting corrosion resistance. Therefore, the lower limit of the Ca concentration is preferably more than 0.00% (preferably 0.05% or more).

Meanwhile, when the Ca concentration increases too much, the corrosion resistance and processability tend to deteriorate. Therefore, the upper limit of the Ca concentration is set at 3.00% or less (preferably at 1.00% or less).

Y at from 0% to 0.50%

Y is an element that contributes to corrosion resistance. Therefore, the lower limit of the Y concentration is preferably more than 0.00% (preferably 0.10% or more).

Meanwhile, when the Y concentration increases too much, the corrosion resistance tends to deteriorate. Therefore, the upper limit of the Y concentration is set at 0.50% or less (preferably at 0.30% or less).

La And Ce at from 0% to Less Than 0.50%

La and Ce are elements that contribute to corrosion resistance. Therefore, the lower limit of each of the La concentration and Ce concentration is preferably more than 0.00% (preferably 0.10% or more).

Meanwhile, when the La concentration or the Ce concentration increases too much, the corrosion resistance tends to deteriorate. Therefore, the upper limit of each of the La concentration and the Ce concentration is set below 0.50% (preferably at 0.40% or less).

Si at from 0% to Less Than 2.50%

Si is an element that contributes to improvement of the corrosion resistance by suppressing growth of an Al—Fe alloy layer. Therefore, the Si concentration is preferably more than 0.00% (preferably 0.05% or more, and more preferably 0.10% or more). In particular, when Sn is not contained (that is, when the Sn concentration is 0%), the Si concentration is preferably 0.10% or more (preferably 0.20% or more) from the viewpoint of ensuring corrosion resistance.

Meanwhile, when the Si concentration increases too much, the corrosion resistance and processability tend to deteriorate. Therefore, the upper limit of the Si concentration is set below 2.50%. In particular, from the viewpoint of corrosion resistance, the Si concentration is preferably 2.40% or less, more preferably 1.80% or less, and further preferably 1.20% or less.

Cr, Ti, Zr, Mo, W, Ag, P, Ni, Co, V, Nb, Cu, Mn, Li, Na, and K at from 0% to Less Than 0.25%

Cr, Ti, Zr, Mo, W, Ag, P, Ni, Co, V, Nb, Cu, Mn, Li, Na, and K are elements that contribute to corrosion resistance. Therefore, the lower limit of the concentration of each of Cr, Ti, Zr, Mo, W, Ag, P, Ni, Co, V, Nb, Cu, Mn, Li, Na and K is preferably more than 0.00% (preferably 0.05% or more, and more preferably 0.10% or more).

Meanwhile, when the concentration of Cr, Ti, Zr, Mo, W, Ag, P, Ni, Co, V, Nb, Cu, Mn, Li, Na, or K increases too much, corrosion resistance tends to deteriorate. Therefore, the upper limit of the concentration of each of Cr, Ti, Zr, Mo, W, Ag, P, Ni, Co, V, Nb, Cu, Mn, Li, Na, and K is set below 0.25%. The upper limit of the concentration of Cr, Ti, Zr, Mo, W, Ag, P, Ni, Co, V, Nb, Cu, Mn, Li, Na, or K is preferably 0.22% or less.

Fe at from 0% to 5.00%

When a coating layer is formed by a hot dip metal coating method, Fe is contained in a Zn—Al—Mg alloy layer and an Al—Fe alloy layer at certain concentrations.

It has been confirmed that there is no adverse effect on the performance, even when Fe is contained in a coating layer (particularly a Zn—Al—Mg alloy layer), up to a concentration of 5.00%. Since most of the Fe is contained in an Al—Fe alloy layer in many cases, when the thickness of this layer is large, the Fe concentration generally increases.

Sr, Sb, Pb, and B at from 0% to Less Than 0.50%

Sr, Sb, Pb, and B are elements that contribute to corrosion resistance. Therefore, the lower limit of the concentration of each of Sr, Sb, Pb, and B is preferably more than 0.00% (preferably 0.05% or more, and more preferably 0.10% or more).

Meanwhile, when the concentration of Sr, Sb, Pb, or B increases too much, the corrosion resistance tends to deteriorate. Therefore, the upper limit of the concentration of each of Sr, Sb, Pb, and B is set below 0.50%.

Impurities

Impurities refer to components contained in raw materials, or components to be mixed in in the manufacturing process, which are not intentionally added. For example, in a coating layer, trace amounts of components other than Fe may be mixed in as impurities in a coating layer by mutual atomic diffusion between a base steel and a coating bath.

The chemical components of a coating layer are measured by the following method.

First, an acid solution in which a coating layer is separated and dissolved with an acid containing an inhibitor that inhibits the corrosion of a base steel is prepared. Next, by measuring the prepared acid solution by an ICP analysis, it is possible to find the chemical composition of the coating layer (in the case where the coating layer has a monolayer structure of a Zn—Al—Mg alloy layer, the chemical composition of the Zn—Al—Mg alloy layer, and in the case where the coating layer has a layered structure of an Al—Fe alloy layer and a Zn—Al—Mg alloy layer, the total chemical composition of the Al—Fe alloy layer and the Zn—Al—Mg alloy layer). There is no particular restriction on the acid species, insofar as it is an acid capable of dissolving the coating layer. The chemical composition is measured as an average chemical composition. In the ICP analysis, the Zn concentration is determined from "Formula: Zn concentration=100%-Concentration (%) of other elements".

Here, when a precoated steel product is used as a base steel, a component of the pre-coating is also detected.

For example, when a Ni precoated steel product is used, not only Ni in the coating layer but also Ni in the Ni precoating is detected in the ICP analysis. Specifically, for example, when a precoated steel product having an Ni deposited amount of from 1 g/m² to 3 g/m² (thickness of about 0.1 to 0.3 μm) is used as a base steel, even if the concentration of Ni contained in the coating layer is 0%, the Ni concentration is detected as from 0.1% to 15% when measured by the ICP analysis.

Here, a method of determining whether a base steel is a Ni precoated steel product is as follows.

A sample in which a cross section cut along the thickness direction of the coating layer serves as a measurement surface is collected from a target steel product.

The vicinity of the interface between the coating layer and the base steel in the steel product is linearly analyzed by an electron probe microanalyzer (FE-EPMA) on the measurement surface of the sample to measure the Ni concentration. The measurement conditions are an acceleration voltage of 15 kV, a beam diameter of about 100 nm, irradiation time per point of 1000 ms, and a measurement pitch of 60 nm. A measurement distance may be any distance insofar as it is possible to confirm whether or not the Ni concentration is concentrated at the interface between a coating layer and a base steel in a steel product.

When the Ni concentration is concentrated at the interface between a coating layer and a base steel in the steel product, the base steel is discriminated as a Ni precoated steel product.

When a Ni precoated steel product is used as a base steel, the Ni concentration of the coating layer is defined as a value measured as follows.

First, with a high frequency glow discharge emission surface analyzer (GDS: manufactured by HORIBA, Ltd., model number: GD-Profiler2), the emission intensity of Ni is measured for three or more kinds of standard samples (Zn alloy standard samples IMN ZH1, ZH2, and ZH4 manufactured by BAS) having different Ni concentrations. A calibration curve is prepared from the relationship between the obtained emission intensity of Ni and the Ni concentration in the standard test.

Next, the emission intensity of Ni at a position where a film thickness of a coating layer of a coated steel product to be measured is ½ is measured by the high frequency glow discharge emission surface analyzer (GDS: manufactured by HORIBA, model number: GD-Profiler2). The Ni concentration at the position of ½ of the coating layer is determined from the obtained emission intensity of Ni and the prepared calibration curve. The Ni concentration at the position ½ of the prepared coating layer is defined as the Ni concentration of the coating layer.

When a Ni precoated steel product is used as a base steel, the Zn concentration of the coating layer is defined as a Zn concentration calculated from the following formula.

Formula: Zn concentration=100-(Concentration of elements other than Zn and Ni determined by ICP analysis+NI concentration determined by GDS)

Measurement conditions of the high frequency glow discharge emission surface analyzer are as follows.

H.V.: 630 V

Anode diameter: φ 4 mm

Gas: Ar

Gas pressure: 600 Pa

Output: 35 W

Next, the Al—Fe alloy layer will be described.

The Al—Fe alloy layer is a layer that is formed on the surface of a base steel (specifically, between a base steel and a Zn—Al—Mg alloy layer), and has a structure constituted mainly with an Al₅Fe phase. The Al—Fe alloy layer is formed by mutual atomic diffusion of a base steel and a coating bath. Since, in the steel product of the disclosure, a coating layer is formed by using a hot dip metal coating method, an Al—Fe alloy layer is easily formed in a coating layer containing an Al element. Since Al is contained in a coating bath at a certain concentration or higher, an Al₅Fe phase is formed at the highest content. However, it takes time for atomic diffusion, and there is a portion where the Fe concentration is high in the vicinity of the base steel. Therefore, the Al—Fe alloy layer may partially contain a small amount of an AlFe phase, an Al₃Fe phase, an Al₅Fe₂ phase, or the like. Also, since Zn is also contained in the coating bath at a certain concentration, the Al—Fe alloy layer also contains a small amount of Zn.

Regarding corrosion resistance of an Al₅Fe phase, an Al₃Fe phase, an AlFe phase, and an Al₅Fe₂ phase, there is no significant difference among any of phases. The referred corrosion resistance is the corrosion resistance at a portion not affected by welding.

When Si is contained in a coating layer, Si is particularly apt to be incorporated into an Al—Fe alloy layer and an Al—Fe—Si intermetallic compound phase may be formed. The intermetallic compound phase to be identified includes an AlFeSi phase, and there are α, β, q1, q2-AlFeSi phases, or the like as isomers. Therefore, these AlFeSi phases or the like may be detected in the Al—Fe alloy layer in some cases. Such an Al—Fe alloy layer including the AlFeSi phases or the like is also referred to as an Al—Fe—Si alloy layer.

Since the thickness of the Al—Fe—Si alloy layer is also small relative to the Zn—Al—Mg alloy layer, the effect on the corrosion resistance of the entire coating layer is small.

Also, when various precoated steel products are used for a base steel, the structure of the Al—Fe alloy layer may be changed in some cases depending on the deposited amount of the precoating. Specifically, there are a case where a layer of a pure metal used for precoating remains in the vicinity of the Al—Fe alloy layer, a case where an intermetallic compound phase (for example, an Al₃Ni phase), in which a constituent component of the Zn—Al—Mg alloy layer is bonded to a precoating component, constitutes an alloy layer, a case where some of Al atoms and Fe atoms are displaced to form an Al—Fe alloy layer, a case where some of Al atoms, Fe atoms, and Si atoms are displaced to form an Al—Fe—Si alloy layer, and the like.

That is, the Al—Fe alloy layer means a layer that includes the above various modes of alloy layers in addition to the alloy layer mainly composed of the $Al_5Fe$ phase.

When a coating layer is formed on a Ni precoated steel product among various precoated steel products, an Al—Ni—Fe alloy layer is formed as the Al—Fe alloy layer.

The thickness of the Al—Fe alloy layer is, for example, 0 μm or more and 7 μm or less.

The thickness of the Al—Fe alloy layer is preferably 0.05 μm or more and 5 μm or less from the viewpoints of increasing the adhesion of the coating layer (specifically, Zn—Al—Mg alloy layer), and ensuring the corrosion resistance and processability.

Since the thickness of a Zn—Al—Mg alloy layer is normally larger than that of an Al—Fe alloy layer, the contribution of an Al—Fe alloy layer as a coated steel product to the corrosion resistance is small as compared with a Zn—Al—Mg alloy layer. However, an Al—Fe alloy layer contains Al and Zn, which are corrosion-resistant elements, at a certain concentration or more, as inferred from the results of a component analysis. Therefore, the Al—Fe alloy layer has a certain degree of corrosion resistance for a base steel.

Also, when a coating layer having the chemical composition specified in the disclosure is formed by a hot dip metal coating method, an Al—Fe alloy layer having a thickness of 100 nm or more is apt to be formed between the base steel and the Zn—Al—Mg alloy layer.

From the viewpoint of corrosion resistance, it is more preferable that the Al—Fe alloy layer is thicker. Therefore, the thickness of the Al—Fe alloy layer is preferably 0.05 μm or more. However, since a thick Al—Fe alloy layer causes significant deterioration in processability, the thickness of the Al—Fe alloy layer is preferably 7 μm or less. When the thickness of the Al—Fe alloy layer is 7 μm or less, cracks generated from the Al—Fe alloy layer and the amount of powdering are reduced and the processability is improved. The thickness of the Al—Fe alloy layer is more preferably 5 μm or less and still more preferably 2 μm or less. The thickness of the Al—Fe alloy layer is measured as follows.

The thickness of an identified Al—Fe alloy layer is measured at optional 5 positions in an SEM backscattered electron image (magnification: 10000×, visual field size: 50 μm in width×200 μm in length, provided that an Al—Fe alloy layer is visible in the visual field) of a cross section of a coating layer (a cross section cut along the thickness direction of the coating layer) prepared by embedding a sample in a resin and then polishing the same. The arithmetic average of the five positions is defined as the thickness of the Al—Fe alloy layer.

Regarding the thickness of the coating layer, the thickness thereof is also measured at optional five positions in the SEM backscattered electron image (magnification: 500×, visual field size: 198 μm in width×244 μm in length, provided that the entire coating layer is visible in the visual field) of the cross section. The arithmetic average of the five positions is defined as the thickness of the coating layer.

(Characteristics of Coated Steel Product)

Average Value of Cumulative Circumferential Length of $Zn/Al/MgZn_2$ Ternary Eutectics In a backscattered electron image of a Zn—Al—Mg alloy layer, obtained by polishing a surface of the coating layer to ½ of a layer thickness, and observing the surface at a magnification of 100× with a scanning electron microscope, $Zn/Al/MgZn_2$ ternary eutectics are present, and an average value of a cumulative circumferential length of the $Zn/Al/MgZn_2$ ternary eutectics is from 100 to 300 mm/mm$^2$.

When the average value of the cumulative circumferential length of the $Zn/Al/MgZn_2$ ternary eutectics is less than 100 mm/mm$^2$, the $Zn/Al/MgZn_2$ ternary eutectics, which cause local corrosion, become too coarse and the corrosion resistance deteriorates. In particular, in the case of use in an environment where water is likely to be accumulated, $Zn/Al/MgZn_2$ ternary eutectics in the coating layer corrode locally and the corrosion rapidly reaches the base iron. In addition, when the coated steel product is processed, the $Zn/Al/MgZn_2$ ternary eutectics do not function as a buffer material, the intermetallic compound phase becomes cracked, the coating layer is easily exfoliated, and processability becomes poor.

When the average value of the cumulative circumferential length of the $Zn/Al/MgZn_2$ ternary eutectics is more than 300 mm/mm$^2$, the $Zn/Al/MgZn_2$ ternary eutectics are excessively refined, and thus when a coated steel product is processed, the $Zn/Al/MgZn_2$ ternary eutectics do not function as a buffer material, the intermetallic compound phase becomes cracked, the coating layer is easily exfoliated, and processability becomes poor.

Therefore, the average value of the cumulative circumferential length of the $Zn/Al/MgZn_2$ ternary eutectics is set at from 100 to 300 mm/mm$^2$. The average value of the cumulative circumferential length of the $Zn/Al/MgZn_2$ ternary eutectics is preferably from 105 to 290 mm/mm$^2$, and more preferably 110 to 280 mm/mm$^2$.

Although there is no particular restriction on the area fraction of the $Zn/Al/MgZn_2$ ternary eutectics in a backscattered electron image of the Zn—Al—Mg alloy layer, the area fraction is preferably from 10% to 50%, and more preferably from 13% to 45% from the viewpoint of processability and corrosion resistance.

Examples of the remnant structure other than the $Zn/Al/MgZn_2$ ternary eutectics include an Al crystal and a $MgZn_2$ phase.

Here, the method of measuring the average value of the cumulative circumferential length of $Zn/Al/MgZn_2$ ternary eutectics, and the area fraction of the $Zn/Al/MgZn_2$ ternary eutectics will be described.

The average value of the cumulative circumferential length of $Zn/Al/MgZn_2$ ternary eutectics, and the area fraction of the $Zn/Al/MgZn_2$ ternary eutectics are measured using a backscattered electron image of the Zn—Al—Mg alloy layer obtained by observing the surface of the coating layer after being polished to ½ of the layer thickness with a scanning electron microscope at a magnification of 100×. A specific method is as follows.

First, a sample is taken from a coated steel product to be measured. In this regard, the sample is taken from a portion which is not in the vicinity (within 2 mm from the end face) of the punched end face of the coated steel product, and is free from a defect of the coating layer.

Next, the surface of the coating layer of the sample (substantially, Zn—Al—Mg alloy layer) is polished in the thickness direction of the coating layer (hereinafter also referred to as "in the "Z-axis direction").

Specifically, the surface of the coating layer is dry-polished with a #1200 abrasive sheet, and then finish-polishing is carried out successively using a finishing liquid containing alumina having an average particle diameter of 3 μm, a finishing liquid containing alumina having an average particle diameter of 1 μm, and a finishing liquid containing colloidal silica in the mentioned order.

In doing so, the Zn intensity in the surface of the coating layer is measured by XRF (X-ray fluorescence analysis) before and after the polishing, and when the Zn intensity after the polishing reduces to ½ the Zn intensity before the polishing, the then thickness of the coating layer is deemed as the ½ layer thickness. Since the Zn—Al—Mg alloy layer occupies ½ or more of the layer thickness of the coating layer, the polished surface obtained by polishing the surface of the coating layer to ½ of the layer thickness is the polished surface of the Zn—Al—Mg alloy layer. Therefore, the metal structure contained in the Zn—Al—Mg alloy layer can be grasped by analyzing the polished surface.

Next, the polished surface is observed with a scanning electron microscope (SEM) at a magnification of 100× to obtain a backscattered electron image (hereinafter also referred to as "SEM backscattered electron image"). The SEM observation conditions are: acceleration voltage at 15 kV, probe-current at 10 nA, and visual field size of 1000 $\mu m \times 800$ $\mu m$.

In an SEM backscattered electron image (gray scale image stored in 8 bits, displayed in 256 colors) using a binarization processing function based on two thresholds of WinROOF2015 (image analysis software) manufactured by Mitani Corporation, $Zn/Al/MgZn_2$ ternary eutectics are identified. In the gray scale image stored in 8 bits, when the light intensity is 0, it represents black, and when the light intensity is the maximum value of 255, it represents white. A phase including Al or Mg having a small atomic number at a higher content usually exhibits a blackish color, while a phase including Zn at a higher content exhibits a whitish color. Among the structures of the coating layer, the whitest structure is a $Zn/Al/MgZn_2$ ternary eutectic (see FIG. 1(A)).

Figure 1B:
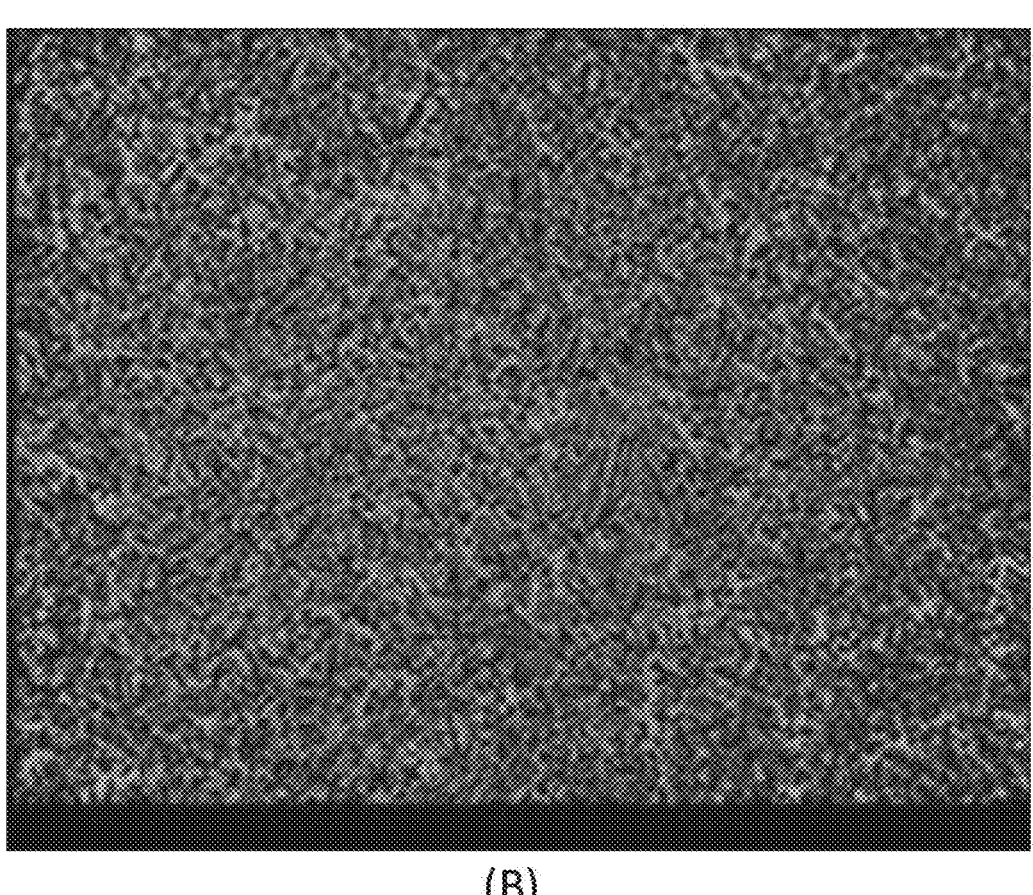
FIG. 1(B) shows an image obtained by binarizing a backscattered electron image of a Zn—Al—Mg alloy layer.

In the case of the SEM backscattered electron image, it has become clear from the results of identification by FE-SEM or TEM, that the $Zn/Al/MgZn_2$ ternary eutectics can be identified with high accuracy when the light intensity thresholds are set at 160 and 215. Therefore, by performing an image processing such that the color is changed in the light intensity range of from 160 to 215, the $Zn/Al/MgZn_2$ ternary eutectic is identified (see FIG. 1(B)).

Next, using the automatic shape characteristics measurement function of WinROOF2015 (image analysis software) manufactured by Mitani Corporation, the circumferential lengths of the $Zn/Al/MgZn_2$ ternary eutectics identified by the image processing are totaled to determine the cumulative circumferential length of the $Zn/Al/MgZn_2$ ternary eutectics. Then the cumulative circumferential length of the $Zn/Al/MgZn_2$ ternary eutectics per unit area ($mm^2$) is calculated by dividing the cumulative circumferential length of the $Zn/Al/MgZn_2$ ternary eutectics by the area of the visual field.

This procedure is performed in three visual fields, and the arithmetic average of the cumulative circumferential length of the $Zn/Al/MgZn_2$ ternary eutectics per unit area ($mm^2$) is defined as "the average value of the cumulative circumferential length of $Zn/Al/MgZn_2$ ternary eutectics".

Further, the area fraction of the $Zn/Al/MgZn_2$ ternary eutectics can be also determined using the automatic shape characteristics measurement function of WinROOF2015 (image analysis software) manufactured by Mitani Corporation. Specifically, in the backscattered electron image of the Zn—Al—Mg alloy layer, the area fraction of the $Zn/Al/MgZn_2$ ternary eutectics identified by binarization (area fraction with respect to the visual field area) is calculated using this function. This procedure is performed in three visual fields, and the calculated average is defined as the area fraction of the "$Zn/Al/MgZn_2$ ternary eutectics".

(Method of Manufacturing Coated Steel Product)

Hereinafter, an example of a method of manufacturing a coated steel product according to the disclosure will be described.

A coated steel product of the disclosure is obtained by forming a coating layer having the above-specified chemical composition and metal structure on the surface(s) (namely, on one side, or both sides) of a base steel (such as a base steel sheet) by a hot dip metal coating method.

Specifically, for example, hot dip metal coating is performed under the following conditions.

For example, a base steel having a surface roughness Ra of a surface to be coated of from 0.3 to 2.0 $\mu m$ is immersed in a coating bath and pulled up from the coating bath, and then cooled down in a temperature range of from 450° C. to 395° C. at an average cooling rate of from 5° C./s to 20° C./s.

Next, cooling down is performed in a temperature range of from 395° C. to 340° C. at an average cooling rate of 3° C./s or less.

Next, cooling down is performed in a temperature range of from 340° C. to 280° C. at an average cooling rate of from 10° C./s to 20° C./s or less.

Here, for coating, for example, a continuous hot dip metal coating method such as a Sendzimir method is carried out.

When the surface roughness Ra of the surface to be coated of the base steel is set at 0.3 $\mu m$ or more, solidified nuclei of the structure of the coating layer are easily formed, and thus Al primary crystals and the like are densely crystallized. By doing so, the $Zn/Al/MgZn_2$ ternary eutectics are finely dispersed, and the average value of the cumulative circumferential length of the $Zn/Al/MgZn_2$ ternary eutectics can be controlled to be within the above range.

However, when the surface roughness Ra of the surface to be coated of the base steel is more than 2.0 $\mu m$, the wettability of the coating deteriorates, and non-coating tends to occur.

The surface roughness Ra of the surface to be coated of the base steel is measured as follows in accordance with JIS B 0633:2001. The average surface roughness of the surface to be coated of the base steel before coating at a length of 10 mm in each of two directions forming a predetermined 90° is measured three times with a contact type surface roughness meter. The arithmetic average value of the obtained measured values of average surface roughness (six measured values in total of 2 directions×3 times) is calculated. This arithmetic average value is defined as the surface roughness Ra of the surface to be coated of the base steel.

In the case of measuring the interface roughness Ra between a base steel and a coating layer, first, the coating layer is removed from the coated steel product by dissolving in hydrochloric acid to which an inhibitor is added. Thereafter, the surface of the base steel on the side from which the coating layer has been removed is measured and the average value is calculated by the same method as described above. This is defined as an interface roughness Ra between a base steel and a coating layer.

In the disclosure, the interface roughness Ra between a base steel (that is, after coating) and a coating layer in a coated steel product and the surface roughness Ra of the surface to be coated of the base steel before coating substantially coincide with each other. That is, when using the base steel having the surface roughness Ra of the surface to be coated of from 0.3 to 2.0 $\mu m$, the interface roughness Ra between a base steel and a coating layer in a resulting coated steel product can be set at from 0.3 to 2.0 $\mu m$.

Here, the coating layer solidifies in the order of Al primary crystals, an Al/MgZn$_2$ phase, a MgZn$_2$ peritectics crystallized around Al primary crystals, and a Zn/Al/MgZn$_2$ ternary eutectic.

Therefore, when cooling down is performed in the temperature range of from 450° C. to 395° C. at an average cooling rate of 5° C./s or more, the Al primary crystals and the Al/MgZn$_2$ phase are finely dispersed. When cooling down is performed in the temperature range of from 395° C. to 340° C. at an average cooling rate of 3° C./s or less, MgZn$_2$ peritectics are reliably crystallized around the Al primary crystals. By doing so, the Zn/Al/MgZn$_2$ ternary eutectics can be refined.

When the average cooling rate in the temperature range of from 450° C. to 395° C. is more than 20° C./s, the Al primary crystals and the Al/MgZn$_2$ phase are excessively finely crystallized, and the Zn/Al/MgZn$_2$ ternary eutectics are also excessively refined. By doing so, the average value of the cumulative circumferential lengths of the Zn/Al/MgZn$_2$ ternary eutectics exceeds the above range.

Next, when cooling down is performed in the temperature range of from 340° C. to 280° C. at an average cooling rate of from 10° C./s to 20° C./s, the Zn/Al/MgZn$_2$ ternary eutectics are refined. Therefore, the average value of the cumulative circumferential lengths of the Zn/Al/MgZn$_2$ ternary eutectics is controlled to be within the above range.

A post-treatment applicable to a coated steel product of this disclosure will be described below.

A film may be formed on the coating layer of a coated steel product of this disclosure. The film may be constituted with a single layer, or two or more layers. Examples of the kind of the film directly on the coating layer include a chromate film, a phosphate film, and a chromate-free film. A chromate treatment, a phosphate treatment, or a chromate-free treatment for forming the film may be performed by a known method.

The chromate treatment includes an electrolytic chromate treatment, by which a chromate film is formed by electrolysis; a reactive chromate treatment, by which a film is formed utilizing a reaction with a material, and then an excess treatment solution is washed out; and a painting type chromate treatment, by which a treatment solution is applied to an object, and then dried without washing with water to form a film. Any treatment may be adopted.

Examples of the electrolytic chromate treatment include those using chromic acid, silica sol, a resin (such as an acrylic resin, a vinyl ester resin, a vinyl acetate/acrylic emulsion, a carboxylated styrene butadiene latex, a diisopropanolamine-modified epoxy resin), or hard silica.

Examples of the phosphate treatment include a zinc phosphate treatment, a zinc calcium phosphate treatment, and a manganese phosphate treatment.

The chromate-free treatment is particularly preferable because it does not impose a burden on an environment. The chromate-free treatment includes an electrolytic chromate-free treatment, by which a chromate-free film is formed by electrolysis; a reactive chromate-free treatment, by which a film is formed utilizing a reaction with a material, and then an excess treatment solution is washed out; and a painting type chromate-free treatment, by which a treatment solution is applied to an object, and then dried without washing with water to form a film. Any treatment may be adopted.

Furthermore, one layer, or two or more layers of an organic resin film may be provided on the film directly on the coating layer. There is no particular restriction on the kind of the organic resin, and examples thereof include a polyester resin, a polyurethane resin, an epoxy resin, an acrylic resin, and a polyolefin resin, as well as modified products of these resins. In this regard, the modified product refers to a resin in which a reactive functional group included in the structure of these resins is reacted with another compound (such as a monomer, or a crosslinking agent) having in its structure a functional group capable of reacting with the former functional group.

As such an organic resin, one kind, or a mixture of two or more kinds of (unmodified) organic resins may be used; or one kind, or a mixture of two or more kinds of organic resins obtained by modifying at least one kind of organic resin in the presence of at least one kind of another organic resin may be used. Further, the organic resin film may contain an optional color pigment or rust preventive pigment. A water-based form prepared through dissolution or dispersion in water may also be used.

EXAMPLES

In order to obtain a coating layer having a chemical composition shown in Table 1 or 2, a predetermined amount of pure metal ingot was used to prepare a coating bath in the air. A hot dip metal coating simulator was used for preparing the coated steel sheet.

As the base steel, a 2.3 mm-thick general use hot-rolled carbon steel sheet (C concentration <less than 0.1%) was used and brush polished, and degreasing and pickling were performed immediately before the coating step. The surface roughness Ra (expressed as "Surface roughness Ra" in Tables) of the surface to be coated of the base steel was as shown in Tables 1 and 2.

In some examples, as the base steel, a Ni precoated steel product prepared by further applying a Ni precoating was used. The deposited amount of Ni was set at from 1 g/m$^2$ to 3 g/m$^2$. In this regard, with respect to an example in which a Ni precoated steel product was used as the base steel, a remark of "Ni precoated" was entered in the column of "Base steel" in the Tables.

A contact type K thermocouple was attached to a back surface of the surface to be coated of the base steel in order to monitor the temperature of the steel product in a coated steel sheet preparing process.

In any sample preparation, the same reduction treatment method was applied to the base steel before immersion in the coating bath. In other words, the base steel was heated from room temperature to 800° C. by electric heating in an N$_2$—H$_2$ (5%) environment (dew point of −40° C. or less, oxygen concentration of less than 25 ppm), retained there for 60 sec, cooled to the coating bath temperature+10° C. by N$_2$ gas blow, and then immediately immersed in the coating bath.

For any coated steel sheet, the coating bath temperature was basically set at 500° C., and a coating bath temperature was further increased at some levels. The immersion time in the coating bath was set at the time (2 seconds) in the tables. The N$_2$ gas wiping pressure was adjusted such that a coating thickness was 30 μm (+1 μm).

The base steel was pulled up from the coating bath, and then subjected to a cooling process under the conditions set forth in Table 1 or 2 with respect to the following average cooling rates at the first to third stages as itemized in Table 1 or 2 to obtain a coating layer.

Average cooling rate at first stage: Average cooling rate in the temperature range of from 450° C. to 395° C.

Average cooling rate at second stage: Average cooling rate in the temperature range of from 395° C. to 340° C.

Average cooling rate at third stage: Average cooling rate in the temperature range of from 340° C. to 280° C.

In the cooling process, the steel product was cooled down by spraying $N_2$ gas onto the steel product after being coated. In this case, cooling was performed while adjusting a spraying amount of the $N_2$ gas so as to achieve a predetermined cooling rate in the above temperature range.

Various Measurements

A sample was cut out from an obtained coated steel sheet. The following items were measured according to the method described above.

Average value of cumulative circumferential lengths of $Zn/Al/MgZn_2$ ternary eutectics (denoted as "Circumferential length of ternary eutectics" in the table)

Area fraction of $Zn/Al/MgZn_2$ ternary eutectics (denoted as "Area fraction of ternary eutectics" in the table)

Thickness of Al—Fe alloy layer (thickness of Al—Ni—Fe alloy layer, in an example in which a Ni precoated steel sheet was used as the base steel)

Processability

A sample was cut out from an obtained coated steel sheet. After bending the sample by 1 T, tape was exfoliated from the processed portion, and an area ratio of the coating layer attached to the tape was evaluated. An area ratio of the deposited coating layer of 5% or less was evaluated as "A", and an area ratio of more than 5% was evaluated as "NG".

Corrosion Resistance

A sample was cut out from an obtained coated steel sheet. Then, the samples were placed flat, and 21 cycles of a combined cycle corrosion test (CCT) in accordance with the corrosion acceleration test (JASO M609-91) were conducted. After performing the corrosion test, the case where the corrosion loss was 35 $g/m^2$ or less was evaluated as "A", and the case where the corrosion loss was more than 35 $g/m^2$ was evaluated as "NG".

Examples are listed in Tables 1 and 2.

TABLE 1

| | | | | | | Coating cooling down | | |
|---|---|---|---|---|---|---|---|---|
| No. | Class | Base steel — | Surface roughness Ra μm | Coating bath temperature (° C.) | Immersion time (sec) | First stage average cooling rate (° C./s) | Second stage average cooling rate (° C./s) | Third stage average cooling rate (° C./s) |
| 1 | Example | — | 1.9 | 500 | 2 | 10 | 2 | 15 |
| 2 | Example | — | 1.4 | 500 | 2 | 10 | 2 | 15 |
| 3 | Example | — | 0.8 | 500 | 2 | 10 | 2 | 15 |
| 4 | Example | — | 0.5 | 500 | 2 | 10 | 2 | 15 |
| 5 | Example | — | 1.1 | 500 | 2 | 10 | 2 | 15 |
| 6 | Example | — | 1.8 | 500 | 2 | 10 | 2 | 15 |
| 7 | Example | — | 1.7 | 500 | 2 | 10 | 2 | 15 |
| 8 | Example | — | 1.2 | 500 | 2 | 10 | 2 | 15 |
| 9 | Example | — | 1 | 500 | 2 | 10 | 2 | 15 |
| 10 | Example | — | 1.6 | 500 | 2 | 10 | 2 | 15 |
| 11 | Example | — | 1.3 | 500 | 2 | 10 | 2 | 15 |
| 12 | Example | — | 0.8 | 500 | 2 | 10 | 2 | 15 |
| 13 | Example | — | 0.9 | 500 | 2 | 10 | 2 | 15 |
| 14 | Example | — | 1.4 | 500 | 2 | 10 | 2 | 15 |
| 15 | Example | — | 1.7 | 500 | 2 | 10 | 2 | 15 |
| 16 | Example | — | 1.2 | 500 | 2 | 10 | 2 | 15 |
| 17 | Example | — | 1.8 | 500 | 2 | 10 | 2 | 15 |
| 18 | Example | — | 0.6 | 500 | 2 | 10 | 2 | 15 |
| 19 | Example | — | 1.4 | 500 | 2 | 10 | 2 | 15 |
| 20 | Example | — | 1.5 | 500 | 2 | 10 | 2 | 15 |
| 21 | Example | — | 1.6 | 500 | 2 | 10 | 2 | 15 |
| 22 | Example | — | 1.4 | 500 | 2 | 10 | 2 | 15 |
| 23 | Example | — | 0.9 | 500 | 2 | 10 | 2 | 15 |
| 24 | Example | — | 0.5 | 500 | 2 | 10 | 2 | 15 |
| 25 | Example | — | 1.6 | 500 | 2 | 10 | 2 | 15 |
| 26 | Example | — | 1.5 | 500 | 2 | 10 | 2 | 15 |
| 27 | Example | — | 1.6 | 500 | 2 | 10 | 2 | 15 |
| 28 | Example | — | 1.3 | 500 | 2 | 10 | 2 | 15 |
| 29 | Example | — | 0.7 | 500 | 2 | 10 | 2 | 15 |
| 30 | Example | — | 0.9 | 500 | 2 | 10 | 2 | 15 |
| 31 | Example | — | 0.6 | 500 | 2 | 10 | 2 | 15 |
| 32 | Example | — | 1.4 | 500 | 2 | 10 | 2 | 15 |
| 33 | Example | — | 1.3 | 500 | 2 | 10 | 2 | 15 |
| 34 | Example | — | 1.6 | 500 | 2 | 10 | 2 | 15 |
| 35 | Example | — | 1.2 | 500 | 2 | 10 | 2 | 15 |
| 36 | Example | — | 1 | 500 | 2 | 10 | 2 | 15 |
| 37 | Example | — | 1.8 | 500 | 2 | 10 | 2 | 15 |
| 38 | Example | — | 1.7 | 500 | 2 | 10 | 2 | 15 |
| 39 | Example | — | 1.3 | 500 | 2 | 10 | 2 | 15 |
| 40 | Example | — | 1.8 | 500 | 2 | 10 | 2 | 15 |
| 41 | Example | — | 1.7 | 500 | 2 | 10 | 2 | 15 |
| 42 | Example | — | 1.5 | 500 | 2 | 10 | 2 | 15 |
| 43 | Example | — | 0.8 | 500 | 2 | 10 | 2 | 15 |
| 44 | Example | — | 1.6 | 500 | 2 | 10 | 2 | 15 |
| 45 | Example | — | 1.4 | 550 | 2 | 10 | 2 | 15 |
| 46 | Example | — | 1.7 | 550 | 2 | 10 | 2 | 15 |
| 47 | Example | — | 1.2 | 500 | 2 | 10 | 2 | 15 |
| 48 | Example | — | 1.7 | 500 | 2 | 10 | 2 | 15 |
| 49 | Example | — | 1.5 | 500 | 2 | 10 | 2 | 15 |

TABLE 1-continued

| 50 | Example | — | 1.9 | 500 | 2 | 10 | 2 | 15 |
|---|---|---|---|---|---|---|---|---|
| 51 | Example | — | 0.7 | 500 | 2 | 5 | 2 | 15 |
| 52 | Example | — | 0.6 | 500 | 2 | 20 | 2 | 15 |
| 53 | Example | — | 1.5 | 500 | 2 | 10 | 3 | 15 |
| 54 | Example | — | 1.7 | 500 | 2 | 10 | 2 | 10 |
| 55 | Example | — | 0.4 | 500 | 2 | 10 | 2 | 20 |
| 56 | Example | Ni precoated | 0.5 | 500 | 2 | 10 | 2 | 15 |
| 57 | Example | Ni precoated | 1.9 | 500 | 2 | 10 | 2 | 15 |
| 58 | Example | Ni precoated | 1.5 | 500 | 2 | 10 | 2 | 15 |
| 59 | Example | Ni precoated | 1.2 | 500 | 2 | 10 | 2 | 15 |

Composition of coating layer (% by mass)

| No. | Class | Zn | Al | Mg | Sn | Bi | In | Ca | Y | La | Ce | Si | Cr | Ti | Zr | Mo | W | Ag | P |
|---|---|---|---|---|---|---|---|---|---|---|---|---|---|---|---|---|---|---|---|
| 1 | Example | 90.40 | 5.50 | 4.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 2 | Example | 89.32 | 5.50 | 5.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 3 | Example | 69.32 | 24.50 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 4 | Example | 78.32 | 18.00 | 3.50 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 5 | Example | 69.82 | 18.00 | 12.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 6 | Example | 75.80 | 18.00 | 6.00 | 0.10 | 0.00 | 0.00 | 0.00 | 0.00 | 0.00 | 0.00 | 0.00 | 0.00 | 0.00 | 0.00 | 0.00 | 0.00 | 0.00 | 0.00 |
| 7 | Example | 75.50 | 18.00 | 6.00 | 0.10 | 0.00 | 0.00 | 0.20 | 0.00 | 0.00 | 0.00 | 0.10 | 0.00 | 0.00 | 0.00 | 0.00 | 0.00 | 0.00 | 0.00 |
| 8 | Example | 75.70 | 18.00 | 6.00 | 0.20 | 0.00 | 0.00 | 0.00 | 0.00 | 0.00 | 0.00 | 0.00 | 0.00 | 0.00 | 0.00 | 0.00 | 0.00 | 0.00 | 0.00 |
| 9 | Example | 75.50 | 18.00 | 6.00 | 0.20 | 0.00 | 0.00 | 0.10 | 0.00 | 0.00 | 0.00 | 0.10 | 0.00 | 0.00 | 0.00 | 0.00 | 0.00 | 0.00 | 0.00 |
| 10 | Example | 75.50 | 18.00 | 6.00 | 0.20 | 0.00 | 0.00 | 0.00 | 0.00 | 0.00 | 0.00 | 0.20 | 0.00 | 0.00 | 0.00 | 0.00 | 0.00 | 0.00 | 0.00 |
| 11 | Example | 75.40 | 18.00 | 6.00 | 0.00 | 0.00 | 0.00 | 0.00 | 0.00 | 0.00 | 0.00 | 0.50 | 0.00 | 0.00 | 0.00 | 0.00 | 0.00 | 0.00 | 0.00 |
| 12 | Example | 74.87 | 18.00 | 6.00 | 0.03 | 0.00 | 0.00 | 0.00 | 0.00 | 0.00 | 0.00 | 1.00 | 0.00 | 0.00 | 0.00 | 0.00 | 0.00 | 0.00 | 0.00 |
| 13 | Example | 74.04 | 18.00 | 6.00 | 0.06 | 0.00 | 0.00 | 0.30 | 0.00 | 0.00 | 0.00 | 1.50 | 0.00 | 0.00 | 0.00 | 0.00 | 0.00 | 0.00 | 0.00 |
| 14 | Example | 75.81 | 18.00 | 6.00 | 0.09 | 0.00 | 0.00 | 0.00 | 0.00 | 0.00 | 0.00 | 0.00 | 0.00 | 0.00 | 0.00 | 0.00 | 0.00 | 0.00 | 0.00 |
| 15 | Example | 75.79 | 18.00 | 6.00 | 0.13 | 0.00 | 0.00 | 0.00 | 0.00 | 0.00 | 0.00 | 0.00 | 0.00 | 0.00 | 0.00 | 0.00 | 0.00 | 0.00 | 0.00 |
| 16 | Example | 75.75 | 18.00 | 6.00 | 0.15 | 0.00 | 0.00 | 0.00 | 0.00 | 0.00 | 0.00 | 0.00 | 0.00 | 0.00 | 0.00 | 0.00 | 0.00 | 0.00 | 0.00 |
| 17 | Example | 74.90 | 18.00 | 6.00 | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 18 | Example | 83.63 | 10.00 | 4.00 | 2.30 | 0.00 | 0.00 | 0.00 | 0.00 | 0.00 | 0.00 | 0.00 | 0.00 | 0.00 | 0.00 | 0.00 | 0.00 | 0.00 | 0.00 |
| 19 | Example | 71.32 | 18.00 | 6.00 | 0.08 | 4.50 | 0.00 | 0.00 | 0.00 | 0.00 | 0.00 | 0.00 | 0.00 | 0.00 | 0.00 | 0.00 | 0.00 | 0.00 | 0.00 |
| 20 | Example | 74.32 | 18.00 | 6.00 | 0.08 | 0.00 | 1.50 | 0.00 | 0.00 | 0.00 | 0.00 | 0.00 | 0.00 | 0.00 | 0.00 | 0.00 | 0.00 | 0.00 | 0.00 |
| 21 | Example | 75.72 | 18.00 | 6.00 | 0.08 | 0.00 | 0.00 | 0.10 | 0.00 | 0.00 | 0.00 | 0.00 | 0.00 | 0.00 | 0.00 | 0.00 | 0.00 | 0.00 | 0.00 |
| 22 | Example | 75.32 | 18.00 | 6.00 | 0.08 | 0.00 | 0.00 | 0.50 | 0.00 | 0.00 | 0.00 | 0.00 | 0.00 | 0.00 | 0.00 | 0.00 | 0.00 | 0.00 | 0.00 |
| 23 | Example | 74.82 | 18.00 | 6.00 | 0.08 | 0.00 | 0.00 | 1.00 | 0.00 | 0.00 | 0.00 | 0.00 | 0.00 | 0.00 | 0.00 | 0.00 | 0.00 | 0.00 | 0.00 |
| 24 | Example | 72.82 | 18.00 | 6.00 | 0.08 | 0.00 | 0.00 | 3.00 | 0.00 | 0.00 | 0.00 | 0.00 | 0.00 | 0.00 | 0.00 | 0.00 | 0.00 | 0.00 | 0.00 |
| 25 | Example | 75.32 | 18.00 | 6.00 | 0.08 | 0.00 | 0.00 | 0.00 | 0.50 | 0.00 | 0.00 | 0.00 | 0.00 | 0.00 | 0.00 | 0.00 | 0.00 | 0.00 | 0.00 |
| 26 | Example | 75.42 | 18.00 | 6.00 | 0.08 | 0.00 | 0.00 | 0.00 | 0.00 | 0.40 | 0.00 | 0.00 | 0.00 | 0.00 | 0.00 | 0.00 | 0.00 | 0.00 | 0.00 |
| 27 | Example | 75.42 | 18.00 | 6.00 | 0.08 | 0.00 | 0.00 | 0.00 | 0.00 | 0.00 | 0.40 | 0.00 | 0.00 | 0.00 | 0.00 | 0.00 | 0.00 | 0.00 | 0.00 |
| 28 | Example | 73.52 | 18.00 | 6.00 | 0.08 | 0.00 | 0.00 | 0.00 | 0.00 | 0.00 | 0.00 | 2.30 | 0.00 | 0.00 | 0.00 | 0.00 | 0.00 | 0.00 | 0.00 |
| 29 | Example | 75.62 | 18.00 | 6.00 | 0.08 | 0.00 | 0.00 | 0.00 | 0.00 | 0.00 | 0.00 | 0.00 | 0.20 | 0.00 | 0.00 | 0.00 | 0.00 | 0.00 | 0.00 |
| 30 | Example | 75.62 | 18.00 | 6.00 | 0.08 | 0.00 | 0.00 | 0.00 | 0.00 | 0.00 | 0.00 | 0.00 | 0.00 | 0.20 | 0.00 | 0.00 | 0.00 | 0.00 | 0.00 |
| 31 | Example | 75.62 | 18.00 | 6.00 | 0.08 | 0.00 | 0.00 | 0.00 | 0.00 | 0.00 | 0.00 | 0.00 | 0.00 | 0.00 | 0.20 | 0.00 | 0.00 | 0.00 | 0.00 |
| 32 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.20 | 0.00 | 0.00 | 0.00 |
| 33 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.20 | 0.00 | 0.00 |
| 34 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.20 | 0.00 |
| 35 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.20 |
| 36 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 37 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 38 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 39 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 40 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 41 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 42 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 43 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 44 | Example | 75.62 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 45 | Example | 70.92 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 46 | Example | 70.92 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 47 | Example | 75.42 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 48 | Example | 75.42 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 49 | Example | 75.42 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 50 | Example | 75.42 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 51 | Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 52 | Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 53 | Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 54 | Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 55 | Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 56 | Example | 75.78 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 57 | Example | 75.79 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 58 | Example | 75.78 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 59 | Example | 75.79 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |

TABLE 1-continued

| | | Composition of coating layer (% by mass) | | | | | | | | | | | | | |
|---|---|---|---|---|---|---|---|---|---|---|---|---|---|---|---|
| No. | Class | Ni | Co | V | Nb | Cu | Mn | Li | Na | K | Fe | Sr | Sb | Pb | B |
| 1 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 2 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 3 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 4 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 5 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 6 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 7 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 8 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 9 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 10 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 11 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 12 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 13 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 14 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 15 | Example | 0.00 | 0.00 | 0.00 | 0.00 | 0.00 | 0.00 | 0.00 | 0.00 | 0.00 | 0.08 | 0.00 | 0.00 | 0.00 | 0.00 |
| 16 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 17 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 18 | Example | 0.00 | 0.00 | 0.00 | 0.00 | 0.00 | 0.00 | 0.00 | 0.00 | 0.00 | 0.07 | 0.00 | 0.00 | 0.00 | 0.00 |
| 19 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 20 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 21 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 22 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 23 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 24 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 25 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 26 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 27 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 28 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 29 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 30 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 31 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 32 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 33 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 34 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 35 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 36 | Example | 0.20 | 0.00 | 0.00 | 0.00 | 0.00 | 0.00 | 0.00 | 0.00 | 0.00 | 0.10 | 0.00 | 0.00 | 0.00 | 0.00 |
| 37 | Example | 0.00 | 0.20 | 0.00 | 0.00 | 0.00 | 0.00 | 0.00 | 0.00 | 0.00 | 0.10 | 0.00 | 0.00 | 0.00 | 0.00 |
| 38 | Example | 0.00 | 0.00 | 0.20 | 0.00 | 0.00 | 0.00 | 0.00 | 0.00 | 0.00 | 0.10 | 0.00 | 0.00 | 0.00 | 0.00 |
| 39 | Example | 0.00 | 0.00 | 0.00 | 0.20 | 0.00 | 0.00 | 0.00 | 0.00 | 0.00 | 0.10 | 0.00 | 0.00 | 0.00 | 0.00 |
| 40 | Example | 0.00 | 0.00 | 0.00 | 0.00 | 0.20 | 0.00 | 0.00 | 0.00 | 0.00 | 0.10 | 0.00 | 0.00 | 0.00 | 0.00 |
| 41 | Example | 0.00 | 0.00 | 0.00 | 0.00 | 0.00 | 0.20 | 0.00 | 0.00 | 0.00 | 0.10 | 0.00 | 0.00 | 0.00 | 0.00 |
| 42 | Example | 0.00 | 0.00 | 0.00 | 0.00 | 0.00 | 0.00 | 0.20 | 0.00 | 0.00 | 0.10 | 0.00 | 0.00 | 0.00 | 0.00 |
| 43 | Example | 0.00 | 0.00 | 0.00 | 0.00 | 0.00 | 0.00 | 0.00 | 0.20 | 0.00 | 0.10 | 0.00 | 0.00 | 0.00 | 0.00 |
| 44 | Example | 0.00 | 0.00 | 0.00 | 0.00 | 0.00 | 0.00 | 0.00 | 0.00 | 0.20 | 0.10 | 0.00 | 0.00 | 0.00 | 0.00 |
| 45 | Example | 0.00 | 0.00 | 0.00 | 0.00 | 0.00 | 0.00 | 0.00 | 0.00 | 0.00 | 5.00 | 0.00 | 0.00 | 0.00 | 0.00 |
| 46 | Example | 0.00 | 0.00 | 0.00 | 0.00 | 0.00 | 0.00 | 0.00 | 0.00 | 0.00 | 5.00 | 0.00 | 0.00 | 0.00 | 0.00 |
| 47 | Example | 0.00 | 0.00 | 0.00 | 0.00 | 0.00 | 0.00 | 0.00 | 0.00 | 0.00 | 0.10 | 0.40 | 0.00 | 0.00 | 0.00 |
| 48 | Example | 0.00 | 0.00 | 0.00 | 0.00 | 0.00 | 0.00 | 0.00 | 0.00 | 0.00 | 0.10 | 0.00 | 0.40 | 0.00 | 0.00 |
| 49 | Example | 0.00 | 0.00 | 0.00 | 0.00 | 0.00 | 0.00 | 0.00 | 0.00 | 0.00 | 0.10 | 0.00 | 0.00 | 0.40 | 0.00 |
| 50 | Example | 0.00 | 0.00 | 0.00 | 0.00 | 0.00 | 0.00 | 0.00 | 0.00 | 0.00 | 0.10 | 0.00 | 0.00 | 0.00 | 0.40 |
| 51 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 52 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 53 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 54 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 55 | Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 56 | Example | 0.04 | 0.00 | 0.00 | 0.00 | 0.00 | 0.00 | 0.00 | 0.00 | 0.00 | 0.10 | 0.00 | 0.00 | 0.00 | 0.00 |
| 57 | Example | 0.03 | 0.00 | 0.00 | 0.00 | 0.00 | 0.00 | 0.00 | 0.00 | 0.00 | 0.10 | 0.00 | 0.00 | 0.00 | 0.00 |
| 58 | Example | 0.04 | 0.00 | 0.00 | 0.00 | 0.00 | 0.00 | 0.00 | 0.00 | 0.00 | 0.10 | 0.00 | 0.00 | 0.00 | 0.00 |
| 59 | Example | 0.03 | 0.00 | 0.00 | 0.00 | 0.00 | 0.00 | 0.00 | 0.00 | 0.00 | 0.10 | 0.00 | 0.00 | 0.00 | 0.00 |

| No. | Class | Circumferential length of ternary eutectics (mm/mm2) | Area fraction of ternary eutectics (%) | Thickness of Al—Fe alloy layer (μm) | Processability | Corrosion resistance |
|---|---|---|---|---|---|---|
| 1 | Example | 115 | 48 | 1 | A | A |
| 2 | Example | 121 | 46 | 1 | A | A |
| 3 | Example | 105 | 11 | 1 | A | A |
| 4 | Example | 140 | 35 | 1 | A | A |
| 5 | Example | 177 | 16 | 1 | A | A |
| 6 | Example | 172 | 23 | 1 | A | A |
| 7 | Example | 169 | 15 | 1 | A | A |
| 8 | Example | 179 | 22 | 1 | A | A |
| 9 | Example | 169 | 20 | 1 | A | A |
| 10 | Example | 176 | 20 | 1 | A | A |
| 11 | Example | 174 | 18 | 1 | A | A |

TABLE 1-continued

| 12 | Example | 183 | 16 | 1 | A | A |
|----|---------|-----|----|---|---|---|
| 13 | Example | 168 | 21 | 1 | A | A |
| 14 | Example | 185 | 25 | 1 | A | A |
| 15 | Example | 180 | 23 | 1 | A | A |
| 16 | Example | 175 | 25 | 1 | A | A |
| 17 | Example | 175 | 24 | 1 | A | A |
| 18 | Example | 125 | 42 | 1 | A | A |
| 19 | Example | 170 | 20 | 1 | A | A |
| 20 | Example | 180 | 19 | 1 | A | A |
| 21 | Example | 183 | 22 | 1 | A | A |
| 22 | Example | 176 | 25 | 1 | A | A |
| 23 | Example | 172 | 24 | 1 | A | A |
| 24 | Example | 181 | 25 | 1 | A | A |
| 25 | Example | 172 | 23 | 1 | A | A |
| 26 | Example | 178 | 25 | 1 | A | A |
| 27 | Example | 180 | 16 | 1 | A | A |
| 28 | Example | 178 | 17 | 1 | A | A |
| 29 | Example | 174 | 17 | 1 | A | A |
| 30 | Example | 178 | 15 | 1 | A | A |
| 31 | Example | 179 | 18 | 1 | A | A |
| 32 | Example | 167 | 18 | 1 | A | A |
| 33 | Example | 175 | 25 | 1 | A | A |
| 34 | Example | 176 | 25 | 1 | A | A |
| 35 | Example | 169 | 18 | 1 | A | A |
| 36 | Example | 176 | 16 | 1 | A | A |
| 37 | Example | 171 | 20 | 1 | A | A |
| 38 | Example | 180 | 21 | 1 | A | A |
| 39 | Example | 171 | 22 | 1 | A | A |
| 40 | Example | 166 | 23 | 1 | A | A |
| 41 | Example | 175 | 22 | 1 | A | A |
| 42 | Example | 184 | 19 | 1 | A | A |
| 43 | Example | 173 | 23 | 1 | A | A |
| 44 | Example | 181 | 23 | 1 | A | A |
| 45 | Example | 181 | 15 | 7 | A | A |
| 46 | Example | 173 | 20 | 4 | A | A |
| 47 | Example | 178 | 23 | 1 | A | A |
| 48 | Example | 168 | 24 | 1 | A | A |
| 49 | Example | 166 | 22 | 1 | A | A |
| 50 | Example | 174 | 24 | 1 | A | A |
| 51 | Example | 105 | 20 | 1 | A | A |
| 52 | Example | 295 | 18 | 1 | A | A |
| 53 | Example | 154 | 23 | 1 | A | A |
| 54 | Example | 156 | 24 | 1 | A | A |
| 55 | Example | 223 | 21 | 1 | A | A |
| 56 | Example | 179 | 22 | 1 | A | A |
| 57 | Example | 165 | 25 | 1 | A | A |
| 58 | Example | 174 | 18 | 1 | A | A |
| 59 | Example | 178 | 19 | 1 | A | A |

TABLE 2

| | | | | | | Coating cooling down | | |
|-----|-------|-------|-----------------------------|-----------------------------|-------------------|------------------------------------------------|-------------------------------------------------|------------------------------------------------|
| No. | Class | Base steel — | Surface roughness Ra μm | Coating bath temperature (° C.) | Immersion time (sec) | First stage average cooling rate (° C./s) | Second stage average cooling rate (° C./s) | Third stage average cooling rate (° C./s) |
| 60 | Comparative Example | — | 1.3 | 500 | 2 | 10 | 2 | 15 |
| 61 | Comparative Example | — | 1.7 | 500 | 2 | 10 | 2 | 15 |
| 62 | Comparative Example | — | 1.1 | 500 | 2 | 10 | 2 | 15 |
| 63 | Comparative Example | — | 1 | 500 | 2 | 10 | 2 | 15 |
| 64 | Comparative Example | — | 0.7 | 500 | 2 | 10 | 2 | 15 |
| 65 | Comparative Example | — | 1.8 | 500 | 2 | 10 | 2 | 15 |
| 66 | Comparative Example | — | 1.3 | 500 | 2 | 10 | 2 | 15 |
| 67 | Comparative Example | — | 0.5 | 500 | 2 | 10 | 2 | 15 |
| 68 | Comparative Example | — | 0.8 | 500 | 2 | 10 | 2 | 15 |

TABLE 2-continued

| No. | Class | | | | | | | |
|---|---|---|---|---|---|---|---|---|
| 69 | Comparative Example | — | 1.4 | 500 | 2 | 10 | 2 | 15 |
| 70 | Comparative Example | — | 1.6 | 500 | 2 | 10 | 2 | 15 |
| 71 | Comparative Example | — | 0.9 | 500 | 2 | 10 | 2 | 15 |
| 72 | Comparative Example | — | 1.6 | 500 | 2 | 10 | 2 | 15 |
| 73 | Comparative Example | — | 1.8 | 500 | 2 | 10 | 2 | 15 |
| 74 | Comparative Example | — | 1 | 500 | 2 | 10 | 2 | 15 |
| 75 | Comparative Example | — | 0.7 | 500 | 2 | 10 | 2 | 15 |
| 76 | Comparative Example | — | 1.5 | 500 | 2 | 10 | 2 | 15 |
| 77 | Comparative Example | — | 1.6 | 500 | 2 | 10 | 2 | 15 |
| 78 | Comparative Example | — | 1.3 | 500 | 2 | 10 | 2 | 15 |
| 79 | Comparative Example | — | 1.1 | 500 | 2 | 10 | 2 | 15 |
| 80 | Comparative Example | — | 0.4 | 500 | 2 | 10 | 2 | 15 |
| 81 | Comparative Example | — | 1.6 | 500 | 2 | 10 | 2 | 15 |
| 82 | Comparative Example | — | 1.8 | 500 | 2 | 10 | 2 | 15 |
| 83 | Comparative Example | — | 1.2 | 500 | 2 | 10 | 2 | 15 |
| 84 | Comparative Example | — | 1 | 500 | 2 | 10 | 2 | 15 |
| 85 | Comparative Example | — | 0.7 | 500 | 2 | 10 | 2 | 15 |
| 86 | Comparative Example | — | 0.9 | 500 | 2 | 10 | 2 | 15 |
| 87 | Comparative Example | — | 1.3 | 500 | 2 | 10 | 2 | 15 |
| 88 | Comparative Example | — | 1.6 | 500 | 2 | 10 | 2 | 15 |
| 89 | Comparative Example | — | 0.8 | 570 | 2 | 10 | 2 | 15 |
| 90 | Comparative Example | — | 1.4 | 500 | 2 | 10 | 2 | 15 |
| 91 | Comparative Example | — | 0.7 | 500 | 2 | 10 | 2 | 15 |
| 92 | Comparative Example | — | 0.6 | 500 | 2 | 10 | 2 | 15 |
| 93 | Comparative Example | — | 1.1 | 500 | 2 | 10 | 2 | 15 |
| 94 | Comparative Example | — | 0.1 | 500 | 2 | 10 | 2 | 15 |
| 95 | Comparative Example | — | 2.5 | 500 | 2 | 10 | 2 | 15 |
| 96 | Comparative Example | — | 0.9 | 500 | 2 | 3 | 2 | 15 |
| 97 | Comparative Example | — | 1.5 | 500 | 2 | 25 | 2 | 15 |
| 98 | Comparative Example | — | 1.9 | 550 | 2 | 10 | 4 | 15 |
| 99 | Comparative Example | — | 1.5 | 500 | 2 | 10 | 2 | 25 |

| | | Composition of coating layer (% by mass) | | | | | | | | | | | | | | | | | |
|---|---|---|---|---|---|---|---|---|---|---|---|---|---|---|---|---|---|---|---|
| No. | Class | Zn | Al | Mg | Sn | Bi | In | Ca | Y | La | Ce | Si | Cr | Ti | Zr | Mo | W | Ag | P |
| 60 | Comparative Example | 63.90 | 24.00 | 12.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 61 | Comparative Example | 96.40 | 0.50 | 3.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 62 | Comparative Example | 67.90 | 26.00 | 6.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 63 | Comparative Example | 81.40 | 18.00 | 0.50 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 64 | Comparative Example | 68.90 | 18.00 | 13.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 65 | Comparative Example | 70.40 | 18.00 | 6.00 | 5.50 | 0.00 | 0.00 | 0.00 | 0.00 | 0.00 | 0.00 | 0.00 | 0.00 | 0.00 | 0.00 | 0.00 | 0.00 | 0.00 | 0.00 |

TABLE 2-continued

| No. | Class | | | | | | | | | | | | | | | | | | |
|---|---|---|---|---|---|---|---|---|---|---|---|---|---|---|---|---|---|---|---|
| 66 | Comparative Example | 70.82 | 18.00 | 6.00 | 0.08 | 5.00 | 0.00 | 0.00 | 0.00 | 0.00 | 0.00 | 0.00 | 0.00 | 0.00 | 0.00 | 0.00 | 0.00 | 0.00 | 0.00 |
| 67 | Comparative Example | 73.82 | 18.00 | 6.00 | 0.08 | 0.00 | 2.00 | 0.00 | 0.00 | 0.00 | 0.00 | 0.00 | 0.00 | 0.00 | 0.00 | 0.00 | 0.00 | 0.00 | 0.00 |
| 68 | Comparative Example | 72.32 | 18.00 | 6.00 | 0.08 | 0.00 | 0.00 | 3.50 | 0.00 | 0.00 | 0.00 | 0.00 | 0.00 | 0.00 | 0.00 | 0.00 | 0.00 | 0.00 | 0.00 |
| 69 | Comparative Example | 75.22 | 18.00 | 6.00 | 0.08 | 0.00 | 0.00 | 0.00 | 0.60 | 0.00 | 0.00 | 0.00 | 0.00 | 0.00 | 0.00 | 0.00 | 0.00 | 0.00 | 0.00 |
| 70 | Comparative Example | 75.22 | 18.00 | 6.00 | 0.08 | 0.00 | 0.00 | 0.00 | 0.00 | 0.60 | 0.00 | 0.00 | 0.00 | 0.00 | 0.00 | 0.00 | 0.00 | 0.00 | 0.00 |
| 71 | Comparative Example | 75.22 | 18.00 | 6.00 | 0.08 | 0.00 | 0.00 | 0.00 | 0.00 | 0.00 | 0.60 | 0.00 | 0.00 | 0.00 | 0.00 | 0.00 | 0.00 | 0.00 | 0.00 |
| 72 | Comparative Example | 73.12 | 18.00 | 6.00 | 0.08 | 0.00 | 0.00 | 0.00 | 0.00 | 0.00 | 0.00 | 2.70 | 0.00 | 0.00 | 0.00 | 0.00 | 0.00 | 0.00 | 0.00 |
| 73 | Comparative Example | 75.52 | 18.00 | 6.00 | 0.08 | 0.00 | 0.00 | 0.00 | 0.00 | 0.00 | 0.00 | 0.00 | 0.30 | 0.00 | 0.00 | 0.00 | 0.00 | 0.00 | 0.00 |
| 74 | Comparative Example | 75.52 | 18.00 | 6.00 | 0.08 | 0.00 | 0.00 | 0.00 | 0.00 | 0.00 | 0.00 | 0.00 | 0.00 | 0.30 | 0.00 | 0.00 | 0.00 | 0.00 | 0.00 |
| 75 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.30 | 0.00 | 0.00 | 0.00 | 0.00 |
| 76 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.30 | 0.00 | 0.00 | 0.00 |
| 77 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.30 | 0.00 | 0.00 |
| 78 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.30 | 0.00 |
| 79 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.30 |
| 80 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 81 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 82 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 83 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 84 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 85 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 86 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 87 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 88 | Comparative Example | 75.52 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 89 | Comparative Example | 68.92 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 90 | Comparative Example | 75.32 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 91 | Comparative Example | 75.32 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 92 | Comparative Example | 75.32 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 93 | Comparative Example | 75.22 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 94 | Comparative Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 95 | Comparative Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 96 | Comparative Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 97 | Comparative Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 98 | Comparative Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |
| 99 | Comparative Example | 75.82 | 18.00 | 6.00 | 0.08 | 0.00 | 0.00 | 0.00 | 0.00 | 0.00 | 0.00 | 0.00 | 0.00 | 0.00 | 0.00 | 0.00 | 0.00 | 0.00 | 0.00 |

| | | Composition of coating layer (% by mass) | | | | | | | | | | | | | |
|---|---|---|---|---|---|---|---|---|---|---|---|---|---|---|---|
| No. | Class | Ni | Co | V | Nb | Cu | Mn | Li | Na | K | Fe | Sr | Sb | Pb | B |
| 60 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 61 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 62 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |

TABLE 2-continued

| | | | | | | | | | | | | | | | |
|---|---|---|---|---|---|---|---|---|---|---|---|---|---|---|---|
| 63 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 64 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 65 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 66 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 67 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 68 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 69 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 70 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 71 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 72 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 73 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 74 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 75 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 76 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 77 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 78 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 79 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 80 | Comparative Example | 0.30 | 0.00 | 0.00 | 0.00 | 0.00 | 0.00 | 0.00 | 0.00 | 0.00 | 0.10 | 0.00 | 0.00 | 0.00 | 0.00 |
| 81 | Comparative Example | 0.00 | 0.30 | 0.00 | 0.00 | 0.00 | 0.00 | 0.00 | 0.00 | 0.00 | 0.10 | 0.00 | 0.00 | 0.00 | 0.00 |
| 82 | Comparative Example | 0.00 | 0.00 | 0.30 | 0.00 | 0.00 | 0.00 | 0.00 | 0.00 | 0.00 | 0.10 | 0.00 | 0.00 | 0.00 | 0.00 |
| 83 | Comparative Example | 0.00 | 0.00 | 0.00 | 0.30 | 0.00 | 0.00 | 0.00 | 0.00 | 0.00 | 0.10 | 0.00 | 0.00 | 0.00 | 0.00 |
| 84 | Comparative Example | 0.00 | 0.00 | 0.00 | 0.00 | 0.30 | 0.00 | 0.00 | 0.00 | 0.00 | 0.10 | 0.00 | 0.00 | 0.00 | 0.00 |
| 85 | Comparative Example | 0.00 | 0.00 | 0.00 | 0.00 | 0.00 | 0.30 | 0.00 | 0.00 | 0.00 | 0.10 | 0.00 | 0.00 | 0.00 | 0.00 |
| 86 | Comparative Example | 0.00 | 0.00 | 0.00 | 0.00 | 0.00 | 0.00 | 0.30 | 0.00 | 0.00 | 0.10 | 0.00 | 0.00 | 0.00 | 0.00 |
| 87 | Comparative Example | 0.00 | 0.00 | 0.00 | 0.00 | 0.00 | 0.00 | 0.00 | 0.30 | 0.00 | 0.10 | 0.00 | 0.00 | 0.00 | 0.00 |
| 88 | Comparative Example | 0.00 | 0.00 | 0.00 | 0.00 | 0.00 | 0.00 | 0.00 | 0.00 | 0.30 | 0.10 | 0.00 | 0.00 | 0.00 | 0.00 |
| 89 | Comparative Example | 0.00 | 0.00 | 0.00 | 0.00 | 0.00 | 0.00 | 0.00 | 0.00 | 0.00 | 7.00 | 0.00 | 0.00 | 0.00 | 0.00 |
| 90 | Comparative Example | 0.00 | 0.00 | 0.00 | 0.00 | 0.00 | 0.00 | 0.00 | 0.00 | 0.00 | 0.00 | 0.60 | 0.00 | 0.00 | 0.00 |
| 91 | Comparative Example | 0.00 | 0.00 | 0.00 | 0.00 | 0.00 | 0.00 | 0.00 | 0.00 | 0.00 | 0.00 | 0.00 | 0.60 | 0.00 | 0.00 |
| 92 | Comparative Example | 0.00 | 0.00 | 0.00 | 0.00 | 0.00 | 0.00 | 0.00 | 0.00 | 0.00 | 0.00 | 0.00 | 0.00 | 0.60 | 0.00 |
| 93 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.60 |
| 94 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 95 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 96 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 97 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 98 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |
| 99 | Comparative Example | 0.00 | 0.00 | 0.00 | 0.00 | 0.00 | 0.00 | 0.00 | 0.00 | 0.00 | 0.10 | 0.00 | 0.00 | 0.00 | 0.00 |

TABLE 2-continued

| No. | Class | Circumferential length of ternary eutectics (mm/mm2) | Area fraction of ternary eutectics (%) | Thickness of Al—Fe alloy layer (μm) | Processability | Corrosion resistance |
|---|---|---|---|---|---|---|
| 60 | Comparative Example | 95 | 8 | 1 | NG | NG |
| 61 | Comparative Example | 65 | 75 | 1 | NG | NG |
| 62 | Comparative Example | 90 | 9 | 1 | NG | NG |
| 63 | Comparative Example | 178 | 20 | 1 | A | NG |
| 64 | Comparative Example | 110 | 9 | 1 | NG | A |
| 65 | Comparative Example | 176 | 15 | 1 | A | NG |
| 66 | Comparative Example | 165 | 21 | 1 | A | NG |
| 67 | Comparative Example | 174 | 23 | 1 | A | NG |
| 68 | Comparative Example | 185 | 23 | 1 | NG | NG |
| 69 | Comparative Example | 173 | 16 | 1 | A | NG |
| 70 | Comparative Example | 171 | 23 | 1 | A | NG |
| 71 | Comparative Example | 168 | 23 | 1 | A | NG |
| 72 | Comparative Example | 168 | 16 | 1 | NG | NG |
| 73 | Comparative Example | 184 | 21 | 1 | A | NG |
| 74 | Comparative Example | 176 | 18 | 1 | A | NG |
| 75 | Comparative Example | 168 | 24 | 1 | A | NG |
| 76 | Comparative Example | 177 | 21 | 1 | A | NG |
| 77 | Comparative Example | 171 | 23 | 1 | A | NG |
| 78 | Comparative Example | 172 | 19 | 1 | A | NG |
| 79 | Comparative Example | 169 | 15 | 1 | A | NG |
| 80 | Comparative Example | 179 | 22 | 1 | A | NG |
| 81 | Comparative Example | 177 | 18 | 1 | A | NG |
| 82 | Comparative Example | 170 | 21 | 1 | A | NG |
| 83 | Comparative Example | 165 | 15 | 1 | A | NG |
| 84 | Comparative Example | 168 | 15 | 1 | A | NG |
| 85 | Comparative Example | 183 | 18 | 1 | A | NG |
| 86 | Comparative Example | 174 | 19 | 1 | A | NG |
| 87 | Comparative Example | 183 | 19 | 1 | A | NG |
| 88 | Comparative Example | 185 | 18 | 1 | A | NG |
| 89 | Comparative Example | 174 | 17 | 8 | NG | A |
| 90 | Comparative Example | 165 | 18 | 1 | A | NG |
| 91 | Comparative Example | 180 | 21 | 1 | A | NG |
| 92 | Comparative Example | 173 | 24 | 1 | A | NG |
| 93 | Comparative Example | 174 | 21 | 1 | A | NG |
| 94 | Comparative Example | 94 | 23 | 1 | NG | NG |
| 95 | Comparative Example | — | — | — | A | NG |

TABLE 2-continued

| 96 | Comparative Example | 90 | 24 | 1 | NG | NG |
|---|---|---|---|---|---|---|
| 97 | Comparative Example | 325 | 18 | 1 | NG | A |
| 98 | Comparative Example | 305 | 16 | 2.5 | NG | A |
| 99 | Comparative Example | 314 | 24 | 1 | NG | A |

From the above results, Examples corresponding to a coated steel product of the disclosure exhibit more excellent corrosion resistance as compared to Comparative Examples along with processability, even when used in an environment where water is likely to be accumulated.

In Test No. 95, non-coating frequently occurred, and the variation in appearance was large, and thus the circumferential length and an area fraction of the ternary eutectics were not measured.

The preferred embodiments of the disclosure have been described in detail with reference to the accompanying drawings, but the disclosure is not limited to such examples. It is obvious that those skilled in the art to which this disclosure belongs can conceive of various changes or modifications within the scope of the technical concept described in the claims. It is obviously understood that these changes or modifications also fall within the technical scope of the disclosure.

The entire disclosure of Japanese Patent Application No. 2022-044295 is incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. A coated steel product comprising a base steel and a coating layer including a Zn—Al—Mg alloy layer provided on a surface of the base steel, wherein the coating layer has a chemical composition composed of, in terms of % by mass:

Zn at more than 65.00%,

Al at more than 5.00% and less than 25.00%,

Mg at more than 3.00% and less than 12.50%,

Sn at from 0% to 3.00%,

Bi at from 0% to less than 5.00%,

In at from 0% to less than 2.00%,

Ca at from 0% to 3.00%,

Y at from 0% to 0.50%,

La at from 0% to less than 0.50%,

Ce at from 0% to less than 0.50%,

Si at from 0% to less than 2.50%,

Cr at from 0% to less than 0.25%,

Ti at from 0% to less than 0.25%,

Zr at from 0% to less than 0.25%,

Mo at from 0% to less than 0.25%,

W at from 0% to less than 0.25%,

Ag at from 0% to less than 0.25%,

P at from 0% to less than 0.25%,

Ni at from 0% to less than 0.25%,

Co at from 0% to less than 0.25%,

V at from 0% to less than 0.25%,

Nb at from 0% to less than 0.25%,

Cu at from 0% to less than 0.25%,

Mn at from 0% to less than 0.25%,

Li at from 0% to less than 0.25%,

Na at from 0% to less than 0.25%,

K at from 0% to less than 0.25%,

Fe at from 0% to 5.00%,

Sr at from 0% to less than 0.50%,

Sb at from 0% to less than 0.50%,

Pb at from 0% to less than 0.50%,

B at from 0% to less than 0.50%, and impurities, wherein, in a backscattered electron image of the Zn—Al—Mg alloy layer, obtained by polishing a surface of the coating layer to ½ of a layer thickness, and observing the surface at a magnification of 100× with a scanning electron microscope, Zn/Al/MgZn$_2$ ternary eutectics are present, and an average value of a cumulative circumferential length of the Zn/Al/MgZn$_2$ ternary eutectics is from 100 to 300 mm/mm$^2$.

2. The coated steel product according to claim 1, wherein the coating layer has an Al—Fe alloy layer between the base steel and the Zn—Al—Mg alloy layer.

3. The coated steel product according to claim 1, wherein an interface roughness Ra between the base steel and the coating layer is from 0.3 to 2.0 μm.

4. A method of manufacturing the coated steel product according to claim 1, wherein a base steel having a surface roughness Ra of a surface to be coated of from 0.3 to 2.0 μm is immersed in a coating bath and pulled up from the coating bath, and then cooled down in a temperature range of from 450° C. to 395° C. at an average cooling rate of from 5 to 20° C./s, cooled down in a temperature range of from 395° C. to 340° C. at an average cooling rate of 3° C./s or less, and cooled down in a temperature range of from 340° C. to 280° C. at an average cooling rate of from 10 to 20° C./s.

\* \* \* \* \*